(12) United States Patent
Holzbach et al.

(10) Patent No.: US 6,407,832 B1
(45) Date of Patent: Jun. 18, 2002

(54) LIGHT SOURCE FOLLOWING OPTICAL SYSTEM FOR HOLOGRAM ILLUMINATION

(75) Inventors: Mark E. Holzbach; Michael A. Klug, both of Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 31 days.

(21) Appl. No.: 09/717,898

(22) Filed: Nov. 20, 2000

Related U.S. Application Data
(60) Provisional application No. 60/166,627, filed on Nov. 19, 1999.

(51) Int. Cl.[7] ................................................. G03H 1/22
(52) U.S. Cl. ..................... 359/32; 359/198; 359/201; 359/212; 359/223; 235/462.34; 235/454; 362/425
(58) Field of Search ......................... 359/32, 196, 198, 359/201, 202, 212, 223, 225, 226, 28; 362/425, 135; 235/454, 455, 427, 462.34

(56) References Cited

U.S. PATENT DOCUMENTS

| | | | | |
|---|---|---|---|---|
| 4,146,784 A | | 3/1979 | Yekutieli | 250/203 |
| 4,204,881 A | | 5/1980 | McGrew | 136/89 |
| 4,349,245 A | * | 9/1982 | Kliman | 126/602 |
| 4,830,445 A | * | 5/1989 | Robinson | 353/88 |
| 5,862,799 A | | 1/1999 | Yogev et al. | 126/578 |
| 5,877,874 A | | 3/1999 | Rosenberg | 359/15 |
| 5,973,807 A | * | 10/1999 | Buchkremer et al. | 359/22 |
| 6,076,732 A | * | 6/2000 | Lan et al. | 235/385 |

* cited by examiner

Primary Examiner—Thong Nguyen
Assistant Examiner—Arnel C. Lavarias
(74) Attorney, Agent, or Firm—Skjerven Morrill LLP; Marc R. Ascolese

(57) ABSTRACT

A system for illumination of a hologram includes a deflection mirror to direct light from a moving light source to illuminate the hologram, and a heliostat for tracking the moving light source and positioning the deflection mirror to direct light therefrom to illuminate the hologram. Such as system is optimized for illuminating outdoor holographic displays while still providing a desirable light source and illumination angle, and doing so efficiently and at low cost.

15 Claims, 2 Drawing Sheets

LIGHT SOURCE FOLLOWING OPTICAL SYSTEM FOR HOLOGRAM ILLUMINATION

This application claims the benefit, under 35 U.S.C. §119 (e), of U.S. Provisional Application No. 60/166,627 Nov. 19, 1999, entitled "Light Source Following Optical System for Hologram Illumination", and naming inventors Mark E. Holzbach and Michael A. Klug. The above-referenced provisional application is hereby incorporated by reference herein in its entirety.

FIELD OF THE INVENTION

The present invention relates in general to the field of hologram display and, more particularly, to a system and method for tracking a light source to illuminate a holographic display and to tracking sunlight to illuminate large scale holograms such as holographic billboard displays.

BACKGROUND OF THE INVENTION

Holograms of any size generally have fixed optical illumination angles for best displaying characteristics such as brightness, spatial image fidelity and color fidelity. Moreover, it is generally preferable to illuminate holograms with light sources that approximate point light sources in order to achieve optimal image resolution. This is because light sources having extended sizes (e.g., incandescent light sources) tend to cause the blurring of image points in the hologram proportional to the size of the light source. Similarly, it is generally preferable to reduce and/or minimize the amount of diffuse light that illuminates a hologram. Consequently, hologram illumination schemes typically use single (or small numbers of) well controlled light sources that approximate point light sources, and contribute little to diffuse lighting of the hologram.

The need to tailor the location of the illumination source with respect to the hologram in order to have optical illumination angles for best displaying characteristics can, for example, be accomplished when an individual viewer can generally hold a small hologram and quickly adjust the illumination angle to establish an optimal viewing position relative to the available light source. The production of relatively large scale holograms is becoming more practical. The holograms typically have fixed positions, potentially unlimited size, and are intended for observation by multiple viewers. For such holograms, handheld manipulation and positioning is no longer a practical solution. Examples of techniques for one-step hologram production of potentially unlimited size holograms can be found in the U.S. Patent Application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety.

The aforementioned problems associated with optimal hologram display are additionally complicated when holograms are used for outdoor displays, and particularly large outdoor display (e.g., billboards) which are now possible due to the previously discussed advances in hologram production technology. The sun is a logical light source for illumination of outdoor holographic displays because sunlight is generally an extremely bright, efficient and low cost illumination source. However, the location of the sun, and thus angle at which the sun illuminates an outdoor holographic displays, changes throughout the day. Additionally, diffuse sunlight (e.g., sunlight scattered by clouds) illuminates outdoor holographic displays in an undesirable manner.

Accordingly, it is desirable to have a hologram illumination system optimized for illuminating outdoor holographic displays while still providing a desirable light source and illumination angle, and doing so efficiently and at low cost.

SUMMARY OF THE INVENTION

In accordance with teachings of the present disclosure, a system is described for illuminating a hologram such as a holographic billboard type display using the sun or other moving light source. One aspect of the present invention includes a system for illuminating relatively large scale holograms with a controlled angle beam of sunlight. Another aspect of the present invention includes using a heliostat to provide illumination from a moving light source for illumination of a hologram. For some applications an artificial light source may be combined with an optical tracking system incorporating teachings of the present invention to provide illumination when a sufficient amount of light from the moving light source is no longer available.

Technical benefits of the present invention including providing bottom illumination of a large scale hologram used in an outdoor display to avoid blurring of the associated image or images on cloudy days due to the effect of diffused light from the clouds. Bottom illumination of a large hologram used in an outdoor display is often more compatible with installation and positioning of an artificial light source relative to the hologram.

Accordingly, one aspect of the present invention provides a system for illumination of a hologram. The system includes at least one deflection mirror to direct light from a moving light source to illuminate the hologram, and a heliostat for tracking the moving light source and positioning the at least one deflection mirror to direct light therefrom to illuminate the hologram.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
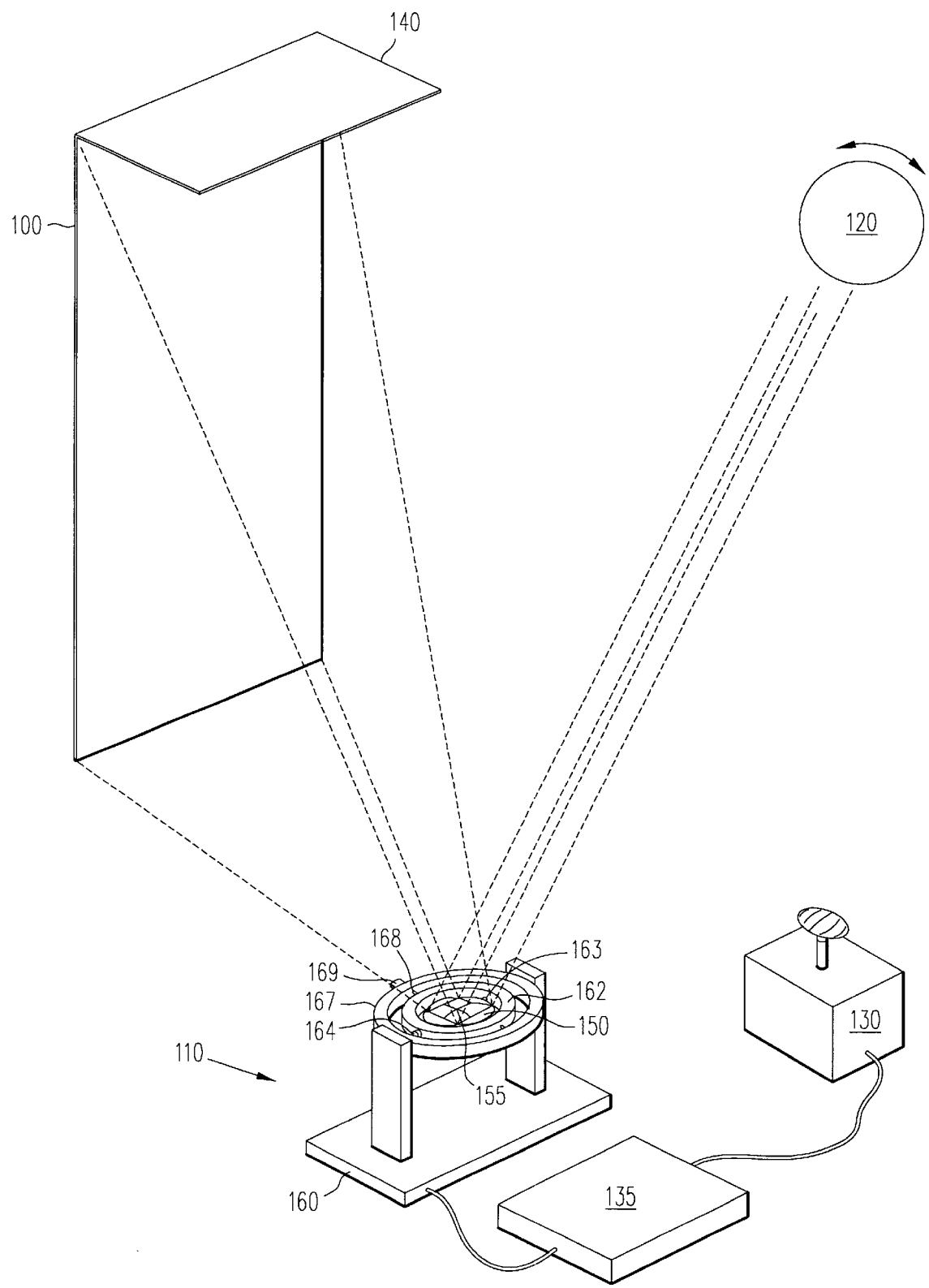
FIG. 1 is a schematic diagram showing a system for illumination of a hologram with light from a moving light source, such as the sun.

FIG. 1 shows hologram 100 which can be illuminated by hologram illumination system 110 using light from a moving source 120, such as the sun. Hologram illumination system 110 preferably includes a heliostat 130 for tracking the moving light source, computer 135, deflection mirror 150, and mirror deflection system 160. Additionally, the system can include light shield 140, as will be described below.

In general, heliostat 130 is an optical system designed to track a moving light source such as the sun. In so doing, heliostat 130 can itself produce either a static or controlled angle-output. That is, some heliostats are designed to track the movement of a moving light source, while ensuring that reflected light from that light source is always reflected to a specific location at a specific angle, or at least some controlled set of locations and angles. Thus, some heliostats include devices such as computer 135 and mirror deflection system 160 implicitly. In the broadest sense, heliostats include devices that track a moving light source, and provide some manner of output information (e.g., control signals) based upon the determined location of the light source. Some heliostats accomplish this task using some type of sensor to monitor the position of the moving light source. In other cases, the motion of the light source may be sufficiently known (or at least calculable from initial conditions) that no sensor is needed. In the example illustrated in FIG. 1, heliostat 130 provides such information to computer 135, which in turn controls mirror deflection system 160. Those having ordinary skill in the art will readily recognize that a variety of hologram illumination systems fall within the scope of the present invention, due in part to the expansive definition of the term "heliostat." Moreover, examples of the various types of heliostats referred to above are well known to those having ordinary skill in the art.

For the embodiment of the present invention as shown in FIG. 1, hologram 100 can be a large outdoor holographic display such as a holographic type billboard designed for observation by multiple viewers. Hologram 100 is preferably designed and produced for bottom illumination such as shown in FIG. 1. During cloudy days or at night when sufficient light is no longer available, an artificial light source (not expressly shown) can also be included as a component in hologram illumination system 110 to provide desired illumination of hologram 100.

Bottom illumination of hologram 100 is often preferable for optimum positioning of hologram illumination system 110, particularly when one or more relatively heavy artificial light sources are included as a component thereof. Powerful artificial light sources are often large and heavy and therefore more conveniently and safely placed below a large scale hologram. Even though hologram 100 is bottom illuminated, a light shield 140 or other device will preferably be provided to protect hologram 100 from direct overhead light. Moreover, light shields can also be mounted along the sides of hologram 100, to further prevent unwanted light from illuminating the hologram. This is particularly useful when diffuse light sources are present, such as sunlight scattered by overhead clouds. Shielding the hologram this way can greatly increase the image contrast.

The hologram illumination system 110 as shown in FIG. 1 can include a variety of different types of mirror deflection systems 160. In the example shown, mirror deflection system 160 can be generally described as a gimbal mounted mirror deflection system. A wide variety of gimbal mounted mirror systems incorporating teachings of the present invention may be satisfactorily used to illuminate a large scale hologram. For one embodiment of the present invention, deflection mirror 150 is preferably mounted on or attached to first axle 163 such that deflection mirror 150 can rotate about a corresponding first axis which passes through center point 155 of deflection mirror 150. First axle 163 is preferably rotatably mounted by bushings and/or bearings to first gimbal mount 162. First axle 163 is preferably rotated by first motor 164 which is controlled by a motor controller (not expressly shown) and/or computer 135. First motor 164 and first axle 163 are attached to first gimbal mount 162.

First gimbal mount 162 also includes second axle 168 attached thereto and extending therefrom. Second axle 168 defines in part a second axis which extends through center point 155 approximately perpendicular or normal to the first axis. Second axle 168 is preferably rotatably mounted by bearings and/or bushings within second gimbal mount 167. Second motor 169 is preferably mounted on one end of second axle 168, and, like first motor 164, is controlled by a motor controller (not expressly shown) and/or computer 135.

First motor 164 and second motor 169 can be, for example, stepper motors or DC servomotors. However, a wide variety of electrical motors can be satisfactorily used as first motor 164 and/or second motor 169. When motor controllers are utilized in the system first motor 164 and second motor 169 can be operated by the same motor controller or by two separate motor controllers. First motor 164, second motor 169 and other components associated with mirror deflection system 160 can be powered by solar panels (not expressly shown), or some other power source. Also, one or more computers 135 can be provided to operate first motor 164 and second motor 169 to position first gimbal mount 162 and second gimbal mount 167 at the desired orientation relative to each other to direct light from deflection mirror 150 at the optimum angle for illumination of hologram 100. Additionally, computer control can be used to direct the deflected light to different locations on hologram 100 (and at different angles of illumination) as desired. For example, if hologram 100 includes multiple elemental holograms (i.e., "hogels") it may be desirable to illuminate different hogels in different ways so as to display different images at different times. Such a system could, for example, present an apparently animated scene.

The computer 135 preferably cooperates with heliostat 130 to track the moving light source and direct light from deflection mirror 150 in generally constant direction and at an optimum angle for illumination of hologram. As with the components associated with mirror deflection system 160, one or more solar panels can be provided for electrical power to operate the computer 135. Additional information concerning gimbal mounts and mirror control systems satisfactory for use with the present invention may be found in copending U.S. patent application Ser. No. 09/098,581 filed on Jun. 17,1998 entitled "Method and Apparatus for Recording One-Step Full-Color, Full-Parallax Holographic Stereograms."

Figure 2:
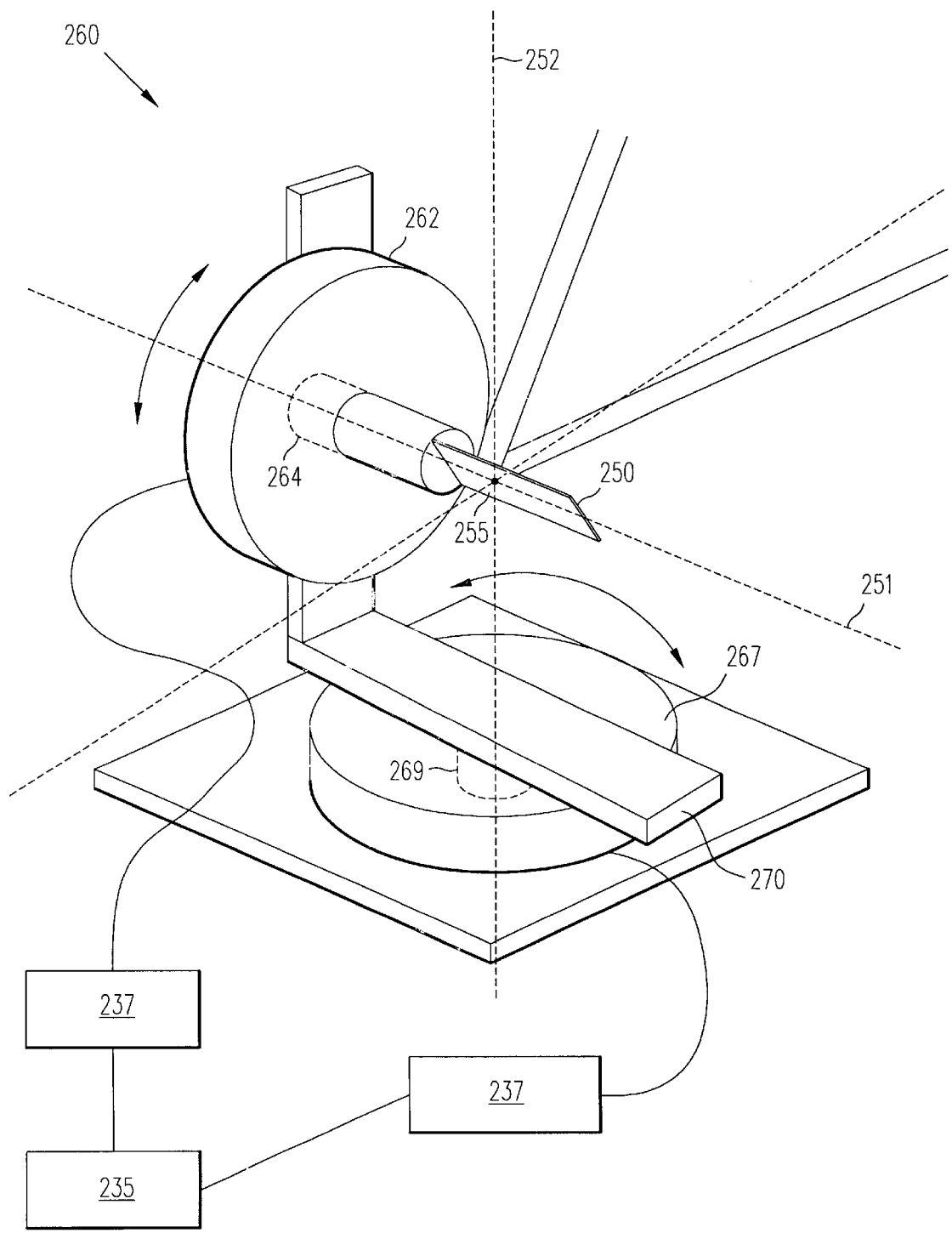
FIG. 2 illustrates an example of a device used for deflecting a mirror to direct light from a moving light source on to a hologram.

FIG. 2 illustrates another example of a device used for deflecting a mirror to direct light from a moving light source on to a hologram. Mirror deflection system 260 includes a deflection mirror 250 that is fixedly mounted to a first rotatable mount 262, such that when the first rotatable mount 262 rotates, the deflection mirror 250 rotates about a first axis 251 which passes through center point 255 of deflection mirror 250. A motor 264 for the first rotatable mount is controlled by a motor controller 237 and rotates the first rotatable mount 262. Motor 264 for the first rotatable mount is fixedly attached to a support 270. First rotatable mount 262 is rotatably mounted to a support 270 with bearings or bushings to allow the first rotatable mount 262 to rotate about the first axis 251. Support 270 is fixedly mounted by an attaching device on a second rotatable mount 267 such that when the second rotatable mount 267 rotates, the deflection mirror 250 rotates about a second axis 252 which passes through the center point 255 of the deflection mirror 250 and which is orthogonal to the first axis 251. A motor 269 for the second rotatable mount is controlled by a motor controller 237 and rotates the second rotatable mount 267. The motors for the first and second rotatable mounts can be, but are not limited to stepper motors or DC servomotors. The same or separate motor controller 237 controlled by computer 235 can control the motors 264 and 269 for the first and second rotatable mounts.

Referring again to FIG. 1, for some applications, multiple mirrors and/or lenses (not expressly shown) can also be included as additional components of hologram illumination system 110 for use in illuminating hologram 100. For example light from deflection mirror 150 can be directed towards a curved reflective surface (not expressly shown) which then illuminates hologram 100. The curved reflective surface may be used to control or limit any divergence of light rays traveling from deflection mirror 150 to hologram 100. Examples of a curved reflective surface and other components which may be used to illuminate hologram 100 in accordance with teachings of the present invention are shown and described in pending U.S. patent application Ser. No. 09/151,330 filed Sep. 11, 1998, and entitled "System and Method for Hologram Illumination," which is hereby incorporated by reference herein in its entirety.

Generally, it is most desirable to motorize the mount to automatically track the sun like a modem heliostat. Computer controlled motors may be the most desirable because they can be conveniently automated and the same computer can control a switch for the optional artificial light used at night, or on cloudy days.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A system for illumination of a hologram comprising:
   at least one deflection mirror to direct light from a moving light source to illuminate the hologram;
   a heliostat for tracking the moving light source and positioning the at least one deflection mirror to direct light therefrom to illuminate the hologram.

2. The system of claim 1, further comprising a curved reflective surface disposed proximate to the at least one deflection mirror to direct light from the at least one deflection mirror to illuminate the hologram.

3. The system of claim 1, further comprising at least one gimbal, the at least one deflection mirror being mounted on the at least one gimbal.

4. The system of claim 1, further comprising:
   a first gimbal mount having a first axle with the at least one deflection mirror securely attached to and mounted on the first axle, the first axle defining in part a first axis which extends through a center point of the at least one deflection mirror;
   a first motor mounted on one end of the first axle for use in rotating the first axle and the at least one deflection mirror attached thereto relative to the first gimbal mount;
   a second axle extending from the first gimbal mount and rotatably engaged with a second gimbal mount, the second axle defining in part a second axis which extends through the center of the at least one deflection mirror at approximately a right angle relative to the first axis;
   a second motor mounted on one end of the second axle for use in rotating the first gimbal mount relative to the second gimbal mount; and
   a control system for operating the first motor and the second motor in response to signals from the heliostat to position the at least one deflection mirror to direct light from the moving light source at an optimum angle for illumination of the hologram.

5. The system of claim 4, wherein the control system includes a computer system.

6. The system of claim 1, further comprising a control system responsive to signals from the heliostat to position the at least one deflection mirror to direct light from the moving light source at a plurality of optimum angles and in a plurality of optimum directions to illuminate different portions of the hologram.

7. The system of claim 1, wherein the hologram further comprises an outdoor billboard type holographic display.

8. The system of claim 1, further comprising a large scale hologram designed for bottom illumination, the at least one deflection mirror being located below the large scale hologram.

9. The system of claim 1, wherein the moving light source comprises the sun.

10. The system of claim 1, further comprising at least one artificial light source for use when the moving light source does not satisfactorily illuminate the hologram.

11. The system of claim 1, wherein the heliostat is operable to position the at least one deflection mirror to direct light therefrom at an optimum angle and in an optimum direction to illuminate the hologram.

12. The system of claim 1 further comprising at least one light shield located to at least partially shield the hologram from illumination from light from a light source other than the at least one deflection mirror.

13. The system of claim 1, wherein the at least one deflection mirror includes a center point, a first axis passing through the center point, and a second axis passing through the center point and orthogonal to the first axis, the system further comprising:
   a first mount supporting the at least one deflection mirror for rotation about the first axis; and
   a second mount supporting the first mount for rotating the at least one deflection mirror about the second axis;
   a control system for operating a first motor and a second motor in response to signals from the heliostat to position the at least one deflection mirror to direct light from the moving light source at an optimum angle for illumination of the hologram.

14. The system of claim 13 further comprising:
   a computer system responsive to signals from the heliostat; and
   a first motor coupled to the first mount and responsive to signals from the computer system thereby controlling rotation of the at least one deflection mirror about the first axis.

15. The system of claim 14 further comprising:
   a second motor coupled to the second mount and responsive to signals from the computer system thereby controlling rotation of the at least one deflection mirror about the second axis.

* * * * *